(12) United States Patent
Seo et al.

(10) Patent No.: US 11,088,385 B2
(45) Date of Patent: Aug. 10, 2021

(54) FUEL CELL SYSTEM AND METHOD OF REPLACING STACK MODULE OF FUEL CELL SYSTEM

(71) Applicants: Hyundai Motor Company, Seoul (KR); Kia Motors Corporation, Seoul (KR)

(72) Inventors: Jun Seok Seo, Gyeonggi-do (KR); Yong Doo Son, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 199 days.

(21) Appl. No.: 16/564,482

(22) Filed: Sep. 9, 2019

(65) Prior Publication Data
US 2020/0343572 A1    Oct. 29, 2020

(30) Foreign Application Priority Data
Apr. 29, 2019 (KR) .................. 10-2019-0050011

(51) Int. Cl.
*H01M 8/249* (2016.01)
*H01M 8/2428* (2016.01)

(52) U.S. Cl.
CPC ......... *H01M 8/249* (2013.01); *H01M 8/2428* (2016.02)

(58) Field of Classification Search
CPC ............... H01M 8/249; H01M 8/2428; H01M 8/04201; H01M 8/04955; H01M 8/04753; H01M 8/04679
See application file for complete search history.

(56) References Cited

U.S. PATENT DOCUMENTS

| | | | |
|---|---|---|---|
| 2004/0069251 A1* | 4/2004 | Rzadki | H02J 4/00 123/3 |
| 2010/0092819 A1* | 4/2010 | Umayahara | B60L 58/40 429/446 |
| 2011/0137501 A1* | 6/2011 | Lee | B60L 58/30 701/22 |
| 2017/0250419 A1* | 8/2017 | Yamaue | H01M 8/04753 |
| 2019/0036140 A1* | 1/2019 | Okuyoshi | H01M 8/04231 |

FOREIGN PATENT DOCUMENTS

KR    101759140 B1    7/2017

* cited by examiner

*Primary Examiner* — Stewart A Fraser
(74) *Attorney, Agent, or Firm* — Mintz Levin Cohn Ferris Glovsky and Popeo, P.C.; Peter F. Corless

(57) ABSTRACT

A fuel cell system for enabling maintenance of a stack module without stopping operation thereof, and a method of replacing a stack module of the fuel cell system are provided. The fuel cell system includes a plurality of stack modules that are connected in parallel to a hydrogen line and an air line. Two or more of the stack modules are connected to form a group, and an inverter is connected to the group of the stack modules and is capable of being turned on and off.

14 Claims, 9 Drawing Sheets

FUEL CELL SYSTEM AND METHOD OF REPLACING STACK MODULE OF FUEL CELL SYSTEM

CROSS-REFERENCE TO RELATED APPLICATION

This application claims the priority benefit of Korean Patent Application No. 10-2019-0050011, filed on Apr. 29, 2019, the disclosure of which is incorporated herein by reference.

BACKGROUND

1. Field of the Invention

The present invention relates to a fuel cell system for enabling maintenance of a stack module without stopping operation thereof, and a method of replacing a stack module of the fuel cell system.

2. Description of the Related Art

In a fuel cell system for electricity generation, a stack module may generate electricity and supply power. A fuel cell stack includes a stack main relay for supplying or blocking power from the stack. When the fuel cell system operates normally, operation is performed in a state in which the stack main relay is connected. Meanwhile, when maintenance work such as repair or replacement of the fuel cell stack is required, operation of the fuel cell system is stopped to completely exhaust the residual voltage of the stack and then the maintenance work of the stack is performed.

However, in such a fuel cell system, since operation of the fuel cell system is stopped whenever maintenance of the stack is required, the rate of operation of the system may decrease. In addition, as the number of times of stopping the system increases, performance of the system parts and the stack module may deteriorate.

The information disclosed in this section is merely for enhancement of understanding of the general background of the invention and should not be taken as an acknowledgement or any form of suggestion that this information forms the prior art already known to a person skilled in the art.

SUMMARY

The present invention provides a fuel cell system for enabling maintenance of a stack module without stopping operation thereof, and a method of replacing a stack module of the fuel cell system. In accordance with an aspect of the present invention, the above and other objects may be accomplished by the provision of a fuel cell system that may include a plurality of stack modules connected in parallel to a hydrogen line and an air line, and a plurality of inverters respectively connected to the stack modules and capable of being turned on and off.

In accordance with another aspect of the present invention, the above and other objects may be accomplished by the provision of a fuel cell system that may include a plurality of stack modules connected in parallel to a hydrogen line and an air line, two or more of the stack modules being connected to configure a group, and an inverter connected to the group of the stack modules and capable of being turned on and off.

The plurality of stack modules may be connected in series to form the group of the stack modules. Main relays may be respectively connected between the stack modules and the inverter for each stack module, and bypass relays may be connected to bypass the stack modules and the main relays paired with each other. A first end of each of the stack modules may be directly connected with a first end of each of the main relays, and both ends of each of the bypass relays may be respectively connected to a second end of each of the stack modules and a second end of each of the main relays.

The plurality of stack modules may be connected in parallel to form the group of the stack modules. Main relays may be respectively connected between the stack modules and the inverter for each stack module. A fuel blocking valve may be disposed on the hydrogen line for each stack module, and a blower may be disposed on the air line for each stack module.

In accordance with another aspect of the present invention, the above and other objects may be accomplished by the provision of a method of replacing a stack module of the fuel cell system that may include a controller configured to individually monitor the stack modules and stop an inverter connected to a stack module, in which abnormality has occurred, and electrically disconnect the stack module, when abnormality of the stack module is detected.

In accordance with another aspect of the present invention, the above and other objects may be accomplished by the provision of a method of replacing a stack module of the fuel cell system that may include individually monitoring the stack modules, by a controller, and opening a main relay connected to a stack module, in which abnormality has occurred, closing a bypass relay, and electrically disconnecting the stack module, when abnormality of the stack module is detected, by the controller.

The method may further include stopping a blower configured to supply air to the stack module after the stack module is electrically disconnected, turning off a fuel blocking module configured to adjust supply of hydrogen fuel to the stack module; and operating the stopped inverter to operate the stack module again, when the stack module is replaced.

In accordance with another aspect of the present invention, the above and other objects may be accomplished by the provision of a method of replacing a stack module of the fuel cell system that may include individually monitoring the stack modules, by a controller and opening a main relay connected to a stack module, in which abnormality has occurred, closing a bypass relay, and electrically disconnecting the stack module, when abnormality of the stack module is detected, by the controller.

The method may further include stopping a blower configured to supply air to the stack module after the stack module is electrically disconnected, turning off a fuel blocking module configured to adjust supply of hydrogen fuel to the stack module, and opening the closed bypass relay and closing the opened main relay to operate the stack module again, when the stack module is replaced.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
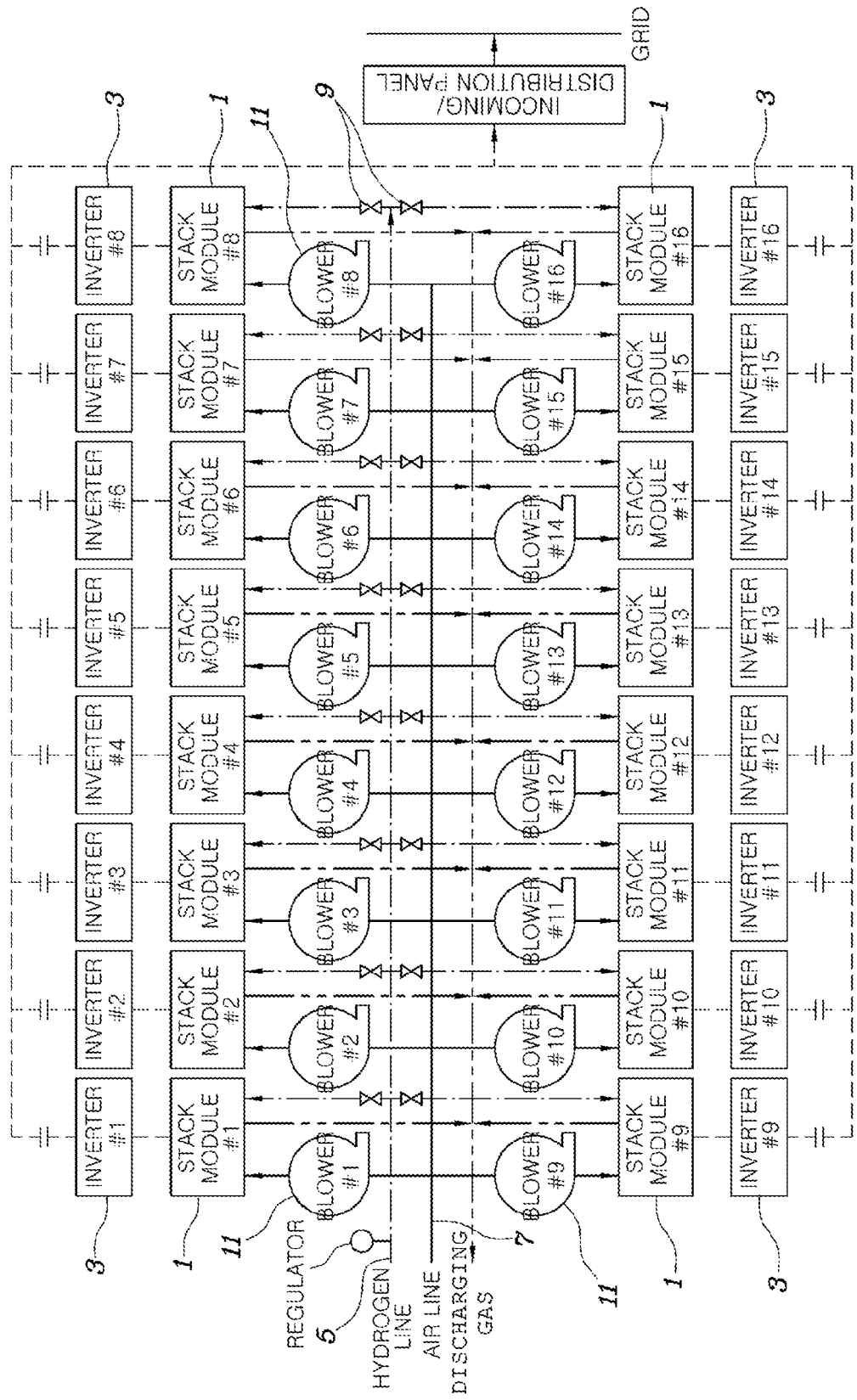
FIG. 1 is a view showing the configuration of a fuel cell system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The exemplary embodiments of the present invention will be described in detail with reference to the accompanying drawings.

The fuel cell system of the present invention is a high-capacity electricity generation system including a plurality of stack modules 1 and inverters 3. FIG. 1 is a view showing the configuration of a first exemplary embodiment of a fuel cell system according to the present invention. Referring to the drawing, first, the stack modules 1 generate electricity using hydrogen as fuel. The plurality of stack modules may be provided and connected to a hydrogen line 5 and an air line 7 in parallel.

For example, a fuel blocking valve 9 may be disposed on the hydrogen line 5 for each stack module 1, such that hydrogen fuel supplied to each stack module 1 may be individually supplied and blocked. A blower 11 may be disposed on the air line 7 for each stack module 1, such that air supplied to each stack module 1 may be individually supplied and blocked. In particular, the inverters 3 may be configured to convert direct current (DC) generated by the stack modules 1 into alternating current (AC) and are respectively provided at the rear ends of the stack modules 1 and may be capable of being turned on and off. The fuel cell system may be configured to be connected to a power grid.

Figure 2:
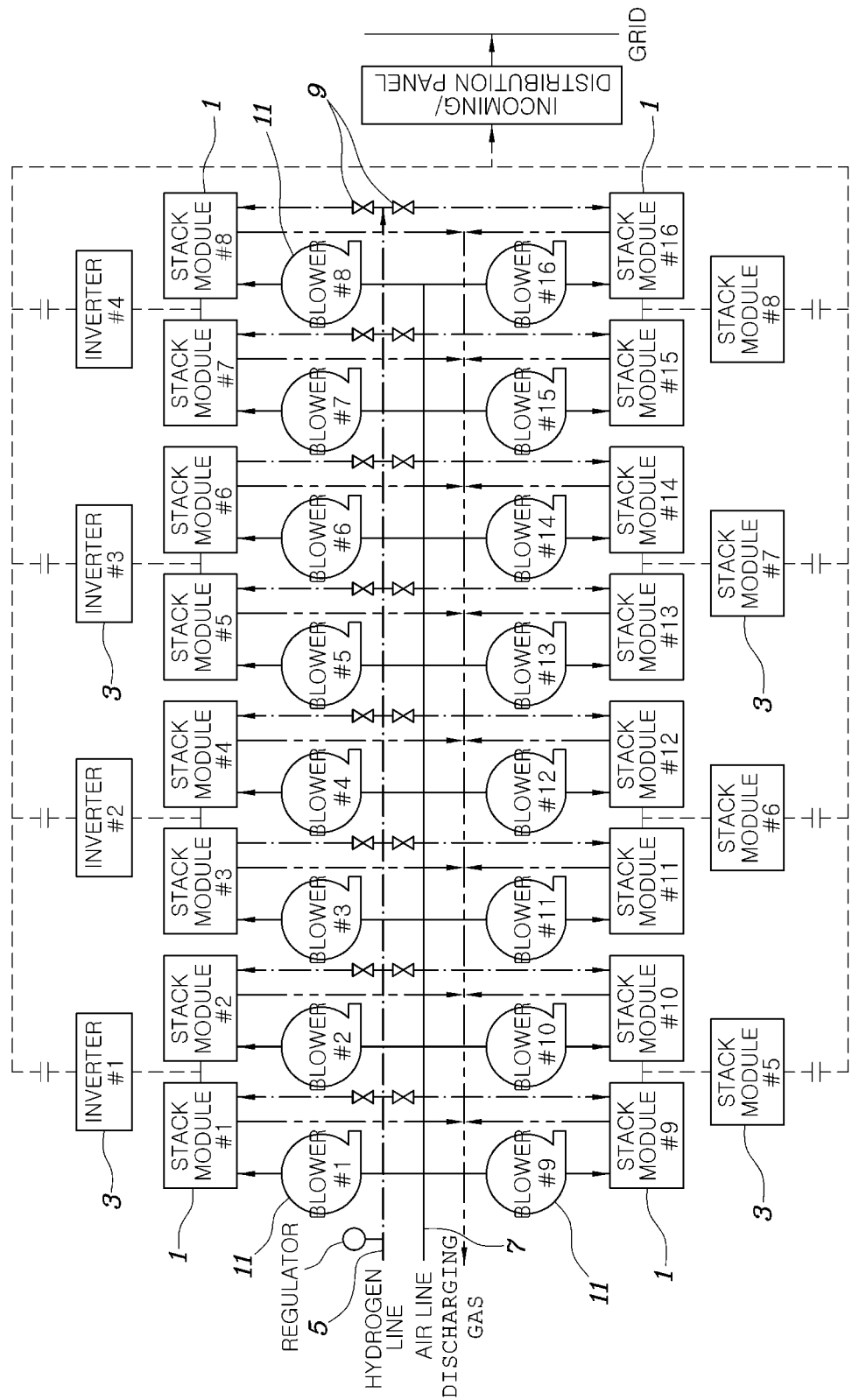
FIG. 2 is a view showing the configuration of a fuel cell system according to an exemplary embodiment of the present invention.

FIG. 2 is a view showing the configuration of a second exemplary embodiment of a fuel cell system according to the present invention. Referring to the drawing, a plurality of stack modules 1 may be provided and connected in parallel to a hydrogen line 5 and an air line 7. Two or more stack modules 1 may be connected to form a group. In addition, inverters 3 may be disposed at the rear ends of the stack modules 1 for each group of the stack modules 1 and are capable of being turned on and off.

According to the above-described configuration, in the present invention, since the inverters 3 may be respectively connected to the stack modules 1, the inverters 3 may be independently stopped, thereby independently blocking power to the stack module 1 or the group of the stack modules 1. Accordingly, a stack module 1, in which abnormality has occurred, is present in the stack modules 1 configuring the fuel cell system, operation of only the inverter 3 connected to the stack module 1, in which abnormality has occurred, may be stopped and the stack module 1 is replaced or repaired. In other words, not all of the inverters are required to be stopped to repair one of the stack modules.

Particularly, when failure occurs in the stack module 1, maintenance of the stack module is enabled without stopping the operation of the fuel cell system, thereby increasing the rate of operation of the fuel cell system. In addition, the number of times of stopping the fuel cell system decreases, thereby preventing performance deterioration of the system parts and the stack modules 1.

Figure 7:
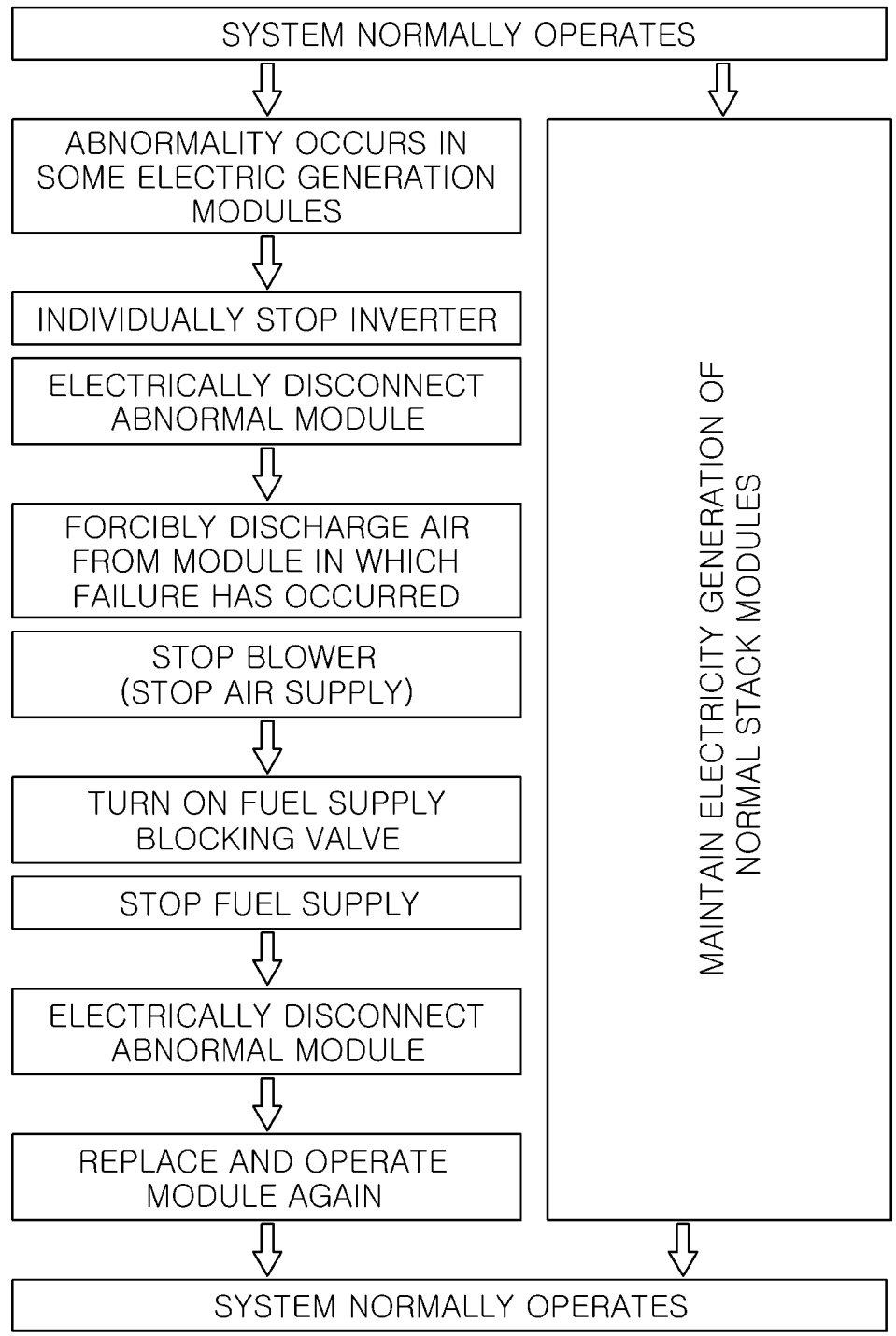
FIG. 7 is a view showing a procedure for replacing a stack module in the configuration of the fuel cell system shown in FIG. 1 according to an exemplary embodiment of the present invention.
Figure 9:
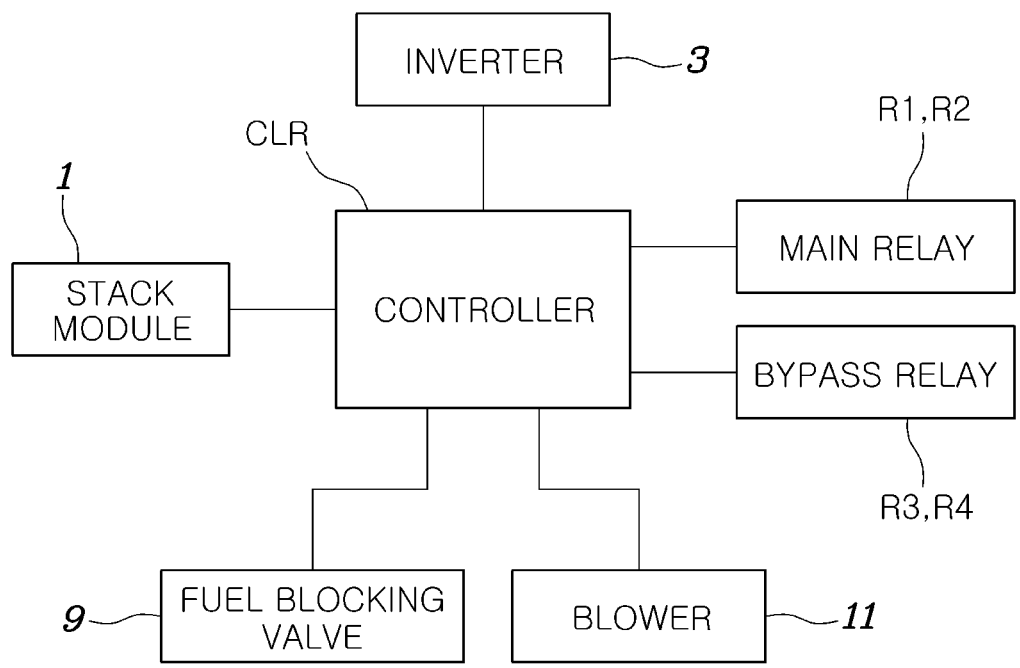
FIG. 9 is a view conceptually illustrating the connection relationship between components operated by a controller according to an exemplary embodiment of the present invention.

A process of replacing a stack module 1, in which failure has occurred, in the fuel cell system shown in FIG. 1 will be described with reference to FIGS. 7 and 9. A controller CLR may be configured to monitor the individual stack modules 1 to diagnose abnormality or failure of the stack modules 1. For example, when abnormality (e.g., failure, malfunction, or the like) has occurred in a first stack module 1*a* as the result of monitoring the stack modules 1, the inverter 3 connected to the first stack module 1*a* may be stopped to enable current flowing in the electrical line to bypass the first stack module 1*a*, thereby electrically disconnecting the first stack module 1*a*.

Subsequently, a blower 11 configured to supply air to the first stack module 1*a* may be stopped to discharge air from the first stack module 1*a*. In addition, a fuel blocking valve 9 configured to supply hydrogen fuel to the first stack module may be turned off to block supply of hydrogen fuel to the first stack module 1*a*. Thereafter, information indicating that the first stack module 1*a* has been completely electrically disconnected may be displayed or audibly output, the first stack module 1*a* may then be replaced with a new stack module, and the stopped inverter 3 may be operated after the replacement, thereby operating the first stack module 1*a* again.

For reference, the controller according to the exemplary embodiment of the present invention may be implemented through an algorithm configured to execute operation of various components of the vehicle or a non-volatile memory (not shown) configured to store data on a software command for performing the algorithm and a processor (not shown) configured to perform the below-described operation using the data stored in the memory. Particularly, the memory and the processor may be implemented as individual chips. Alternatively, the memory and the processor may be integrally implemented as a single chip. The processor may include one or more processors.

Moreover, in the fuel cell system according to the second exemplary embodiment of the present invention, the plurality of stack modules 1 may be connected in series to form the group of the stack modules 1. In particular, in the fuel cell system in which the plurality of stack modules 1 form the group, when failure occurs in some of the stack modules 1, electricity bypasses only the stack module 1, in which failure has occurred, through on/off of the relay, thereby allowing the stack to be replaced or repaired without stopping the operation of the fuel cell system.

Figure 3:
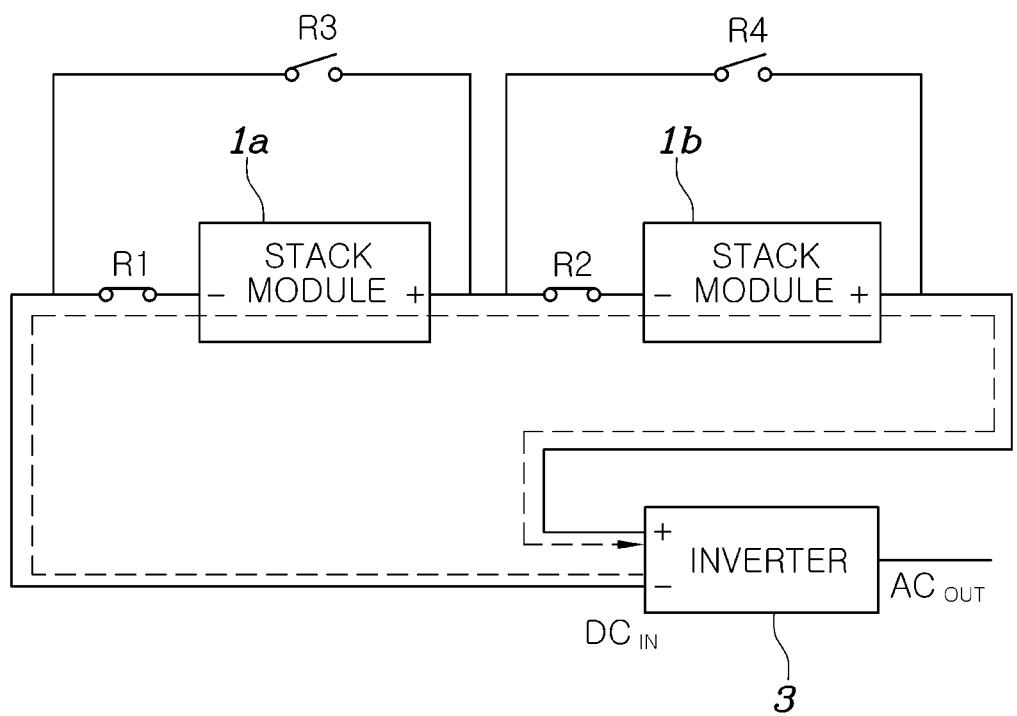
FIG. 3 is a view showing the configuration of stack modules connected in series in the fuel cell system shown in FIG. 2 according to an exemplary embodiment of the present invention.

Accordingly, in the present invention, as shown in FIG. 3, main relays R1 and R2 may be respectively connected between the stack modules 1 and the inverter 3 for each stack module 1 and bypass relays R3 and R4 may be connected to bypass the stack modules 1 and the main relays R1 and R2 paired with each other. Specifically, a first end of each stack module 1 may be directly connected with a first end of each of the main relays R1 and R2 and both ends of each of the bypass relays R3 and R4 may be respectively connected to a second end of each stack module 1 and a second end of each of the main relays R1 and R2.

For example, two stack modules, that is, the first stack module 1*a* and the second stack module 1*b*, may be connected in series to form a group, the front end of the first stack module 1*a* may be directly connected with the first main relay R1 and both ends of the first bypass relay R3 are respectively connected to the front end of the first main relay R1 and the rear end of the first stack module 1*a*. In addition, the front end of the second stack module 1*b* may be directly connected with the second main relay R2 and both ends of the second bypass relay R4 may be connected to the front end of the second main relay R2 and the rear end of the second stack module 1*b*.

The first stack module 1*a* and the second stack module 1*b* may be connected in series with the second main relay R2 interposed therebetween. In other words, when the fuel cell system operates normally, as shown in FIG. 3, operation may be performed in a state in which the first main relay R1 and the second main relay R2 are closed and the first bypass relay R3 and the second bypass relay R4 are open, thereby transmitting electricity generated in the first stack module 1*a* and the second stack module 1*b* to the inverter 3.

Figure 4:
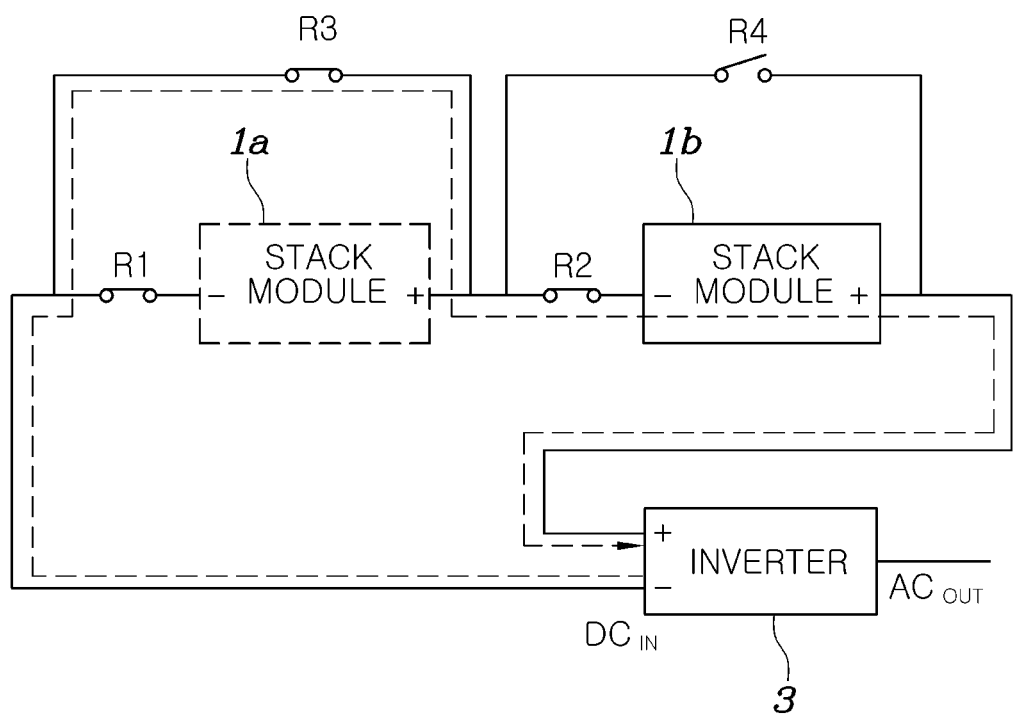
FIG. 4 is a view illustrating operation of bypassing a stack module, in which a failure has occurred, by a bypass relay in FIG. 3 according to an exemplary embodiment of the present invention.

However, when failure occurs in some stack modules 1 in the fuel cell system of FIG. 3, current bypasses the stack module 1, in which failure has occurred, through operation of the relay provided in the stack module 1. For example, as shown in FIG. 4, when failure occurs in the first stack module 1*a*, the first main relay R1 may be opened, the first bypass relay R3 may be closed, the second main relay R2 may be maintained in a closed state, and the second bypass relay R4 may be maintained in an opened state.

Therefore, the second stack module 1*b* continuously generates electricity. Electricity generated in a normal stack module bypasses the first stack module 1*a*, thereby allowing the first stack module 1*a* in which failure has occurred, to be replaced or repaired without stopping the fuel cell system. Meanwhile, in the fuel cell system according to the second exemplary embodiment of the present invention, the plurality of stack modules 1 may be connected in parallel to form a group of the stack modules 1.

In particular, in the fuel cell system in which the plurality of stack modules 1 forms the group, when failure occurs in some of the stack modules 1, electricity bypasses only the stack module 1, in which failure has occurred, through on/off of the relay, thereby allowing the stack to be replaced or repaired without stopping the operation of the fuel cell system. Accordingly, in the present invention, as shown in FIG. 5, main relays R1 and R2 may be respectively connected between the stack modules 1 and the inverter 3 for each stack module 1.

For example, when two stack modules, that is, the first stack module 1*a* and the second stack module 1*b*, are connected in parallel to form a group, the front end of the first stack module 1*a* may be directly connected with the first main relay R1 and the front end of the second stack module 1*b* may be directly connected with the second main relay R2. The front ends of the first main relay R1 and the second main relay R2 may be connected in parallel and the rear ends of the first stack module 1*a* and the second stack module 1*b* may be connected in parallel.

Figure 5:
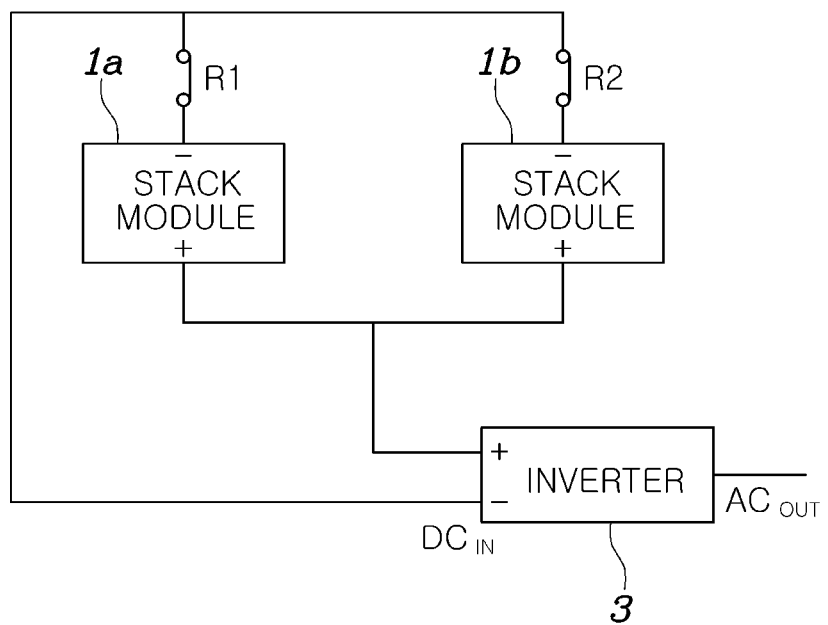
FIG. 5 is a view showing the configuration of stack modules connected in parallel in the fuel cell system shown in FIG. 2 according to an exemplary embodiment of the present invention.

In other words, when the fuel cell system operates normally, as shown in FIG. 5, operation may be performed in a state in which the first main relay R1 and the second main relay R2 are closed, thereby transmitting electricity generated in the first stack module 1*a* and the second stack module 1*b* to the inverter 3. However, when failure occurs in some stack modules 1 in the fuel cell system of FIG. 5, current bypasses the stack module 1, in which failure has occurred, through operation of the relay provided in the stack module 1.

Figure 6:
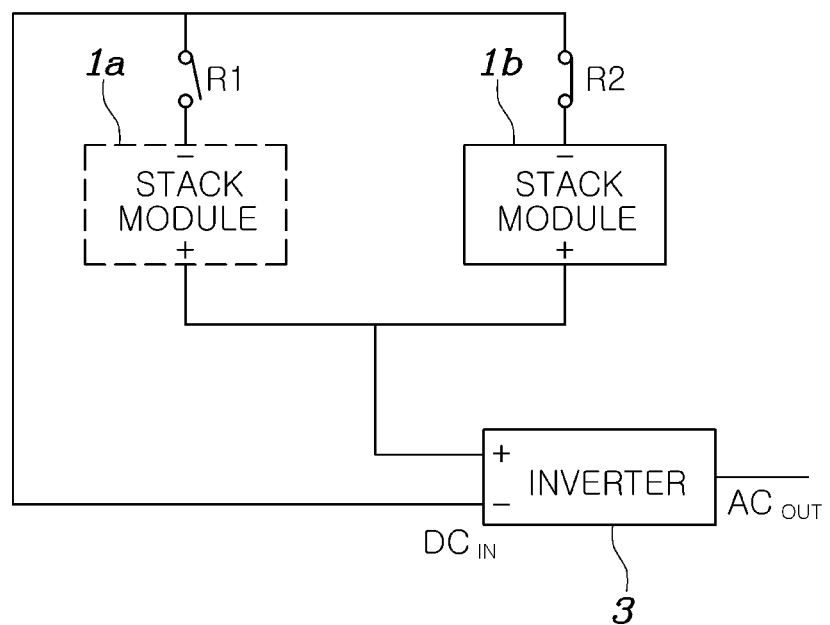
FIG. 6 is a view illustrating operation of blocking current flow to a stack module, in which a failure has occurred, in FIG. 5 according to an exemplary embodiment of the present invention.

For example, as shown in FIG. 6, when failure occurs in the first stack module 1a, the first main relay R1 may be opened and the second main relay R2 may be maintained in a closed state. Therefore, the second stack module 1b continuously generates electricity. Electricity generated in a normal stack module bypasses the first stack module 1a, thereby allowing the first stack module 1a in which failure has occurred, to be replaced or repaired without stopping the fuel cell system.

Figure 8:
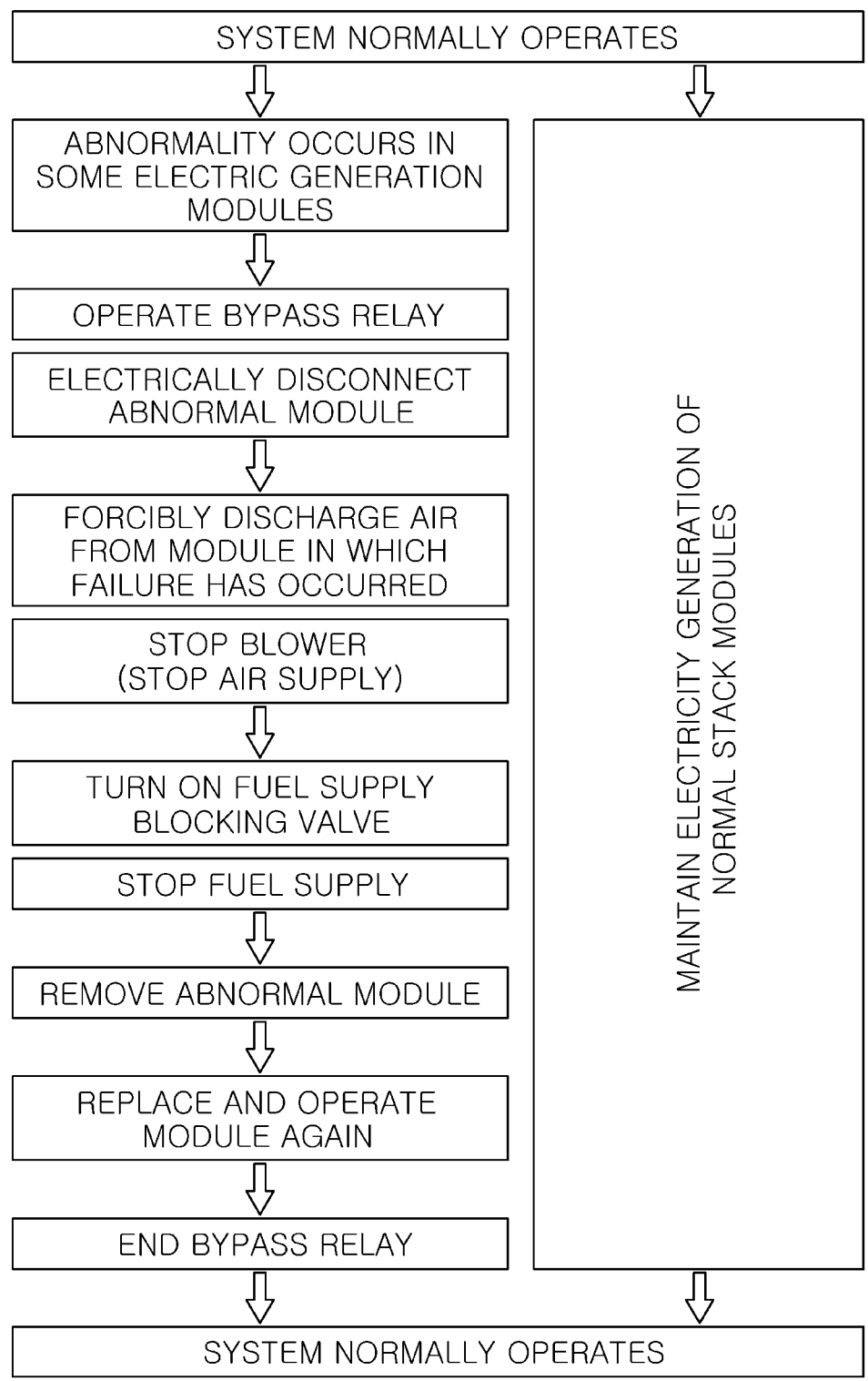
FIG. 8 is a view showing a procedure for replacing a stack module in the configuration of the fuel cell system shown in FIG. 2 according to an exemplary embodiment of the present invention.

A process of replacing a stack module 1, in which failure has occurred, in the fuel cell system shown in FIGS. 4 and 5 will be described with reference to FIGS. 8 and 9. A controller CLR may be configured to monitor the individual stack modules 1 to diagnose abnormality of the stack modules 1. For example, when abnormality occurs in a first stack module 1a as the result of monitoring the stack modules 1 as shown in FIG. 5, the first main relay R1 connected to the first stack module 1a may be opened and the first bypass valve may be closed such that current flowing in the electrical line bypasses the first stack module 1a, thereby electrically disconnecting the first stack module 1a.

Subsequently, a blower 11 configured to supply air to the first stack module 1a may be stopped to discharge air from the first stack module 1a. In addition, a fuel blocking valve 9 configured to adjust supply of hydrogen fuel to the first stack module 1a may be turned off to block supply of hydrogen fuel to the first stack module 1a. Thereafter, information indicating that the first stack module 1a has been completely electrically disconnected may be displayed or audibly output, the first stack module 1a may be replaced with a new stack module, and then the first bypass relay R3 may be opened and the first main relay R1 may be closed, to thus operate the first stack module 1a again.

As described above, a stack module 1 in which abnormality has occurred is present in the stack modules 1 configuring the fuel cell system, and the inverter 3 or the relay operates, allowing the stack module 1 in which failure has occurred to be replaced or repaired. When failure occurs in the stack module 1, maintenance of the stack module 1 is enabled without stopping the operation of the fuel cell system, thereby increasing the rate of operation of the fuel cell system. In addition, the number of times of stopping the fuel cell system decreases, thereby preventing performance deterioration of the system parts and the stack modules 1.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fuel cell system, comprising:
a plurality of stack modules connected in parallel to a hydrogen line and an air line; and
a plurality of inverters respectively connected to the stack modules and capable of being turned on and off.

2. The fuel cell system according to claim 1, wherein main relays are respectively connected between each of the stack modules and the inverter for each stack module, and bypass relays are connected to bypass the stack modules and the main relays paired with each other.

3. The fuel cell system according to claim 2, wherein a first end of each of the stack modules is directly connected with a first end of each of the main relays, and both ends of each of the bypass relays are respectively connected to a second end of each of the stack modules and a second end of each of the main relays.

4. A method of replacing a stack module of the fuel cell system according to claim 1, comprising:
individually monitoring, by a controller, the stack modules; and
stopping, by the controller, an inverter connected to a stack module, in which abnormality has occurred, and electrically disconnecting the stack module, when abnormality of the stack module is detected.

5. The method according to claim 4, further comprising:
stopping, by the controller, a blower configured to supply air to the stack module after the stack module is electrically disconnected;
turning off, by the controller, a fuel blocking module configured to adjust supply of hydrogen fuel to the stack module; and
operating, by the controller, the stopped inverter to operate the stack module again, when the stack module is replaced.

6. A fuel cell system, comprising:
a plurality of stack modules connected in parallel to a hydrogen line and an air line, wherein two or more of the stack modules are connected to form a group; and
an inverter connected to the group of the stack modules and capable of being turned on and off.

7. The fuel cell system according to claim 6, wherein the two or more of the stack modules are connected in series to form the group of the stack modules.

8. The fuel cell system according to claim 7,
wherein main relays are respectively connected between each of the stack modules and the inverter for each stack module, and
wherein bypass relays are connected to bypass the stack modules and the main relays paired with each other.

9. A method of replacing a stack module of the fuel cell system according to claim 8, comprising:
individually monitoring, by a controller, the stack modules; and
opening, by the controller, a main relay connected to a stack module, in which abnormality has occurred, closing a bypass relay, and electrically disconnecting the stack module, when abnormality of the stack module is detected.

10. The method according to claim 9, further comprising:
stopping, by the controller, a blower configured to supply air to the stack module after the stack module is electrically disconnected;
turning off, by the controller, a fuel blocking module configured to adjust supply of hydrogen fuel to the stack module; and
opening, by the controller, the closed bypass relay and closing the opened main relay to operate the stack module again, when the stack module is replaced.

11. The fuel cell system according to claim 7,
wherein a first end of each of the stack modules is directly connected with a first end of each of the main relays, and
wherein both ends of each of the bypass relays are respectively connected to a second end of each of the stack modules and a second end of each of the main relays.

12. The fuel cell system according to claim 6, wherein the plurality of stack modules is connected in parallel to form the group of the stack modules.

13. The fuel cell system according to claim 6, wherein main relays are respectively connected between the stack modules and the inverter for each stack module.

14. The fuel cell system according to claim 6,
   wherein a fuel blocking valve is disposed on the hydrogen line for each stack module, and
   wherein a blower is disposed on the air line for each stack module.

\* \* \* \* \*